Figure 1:
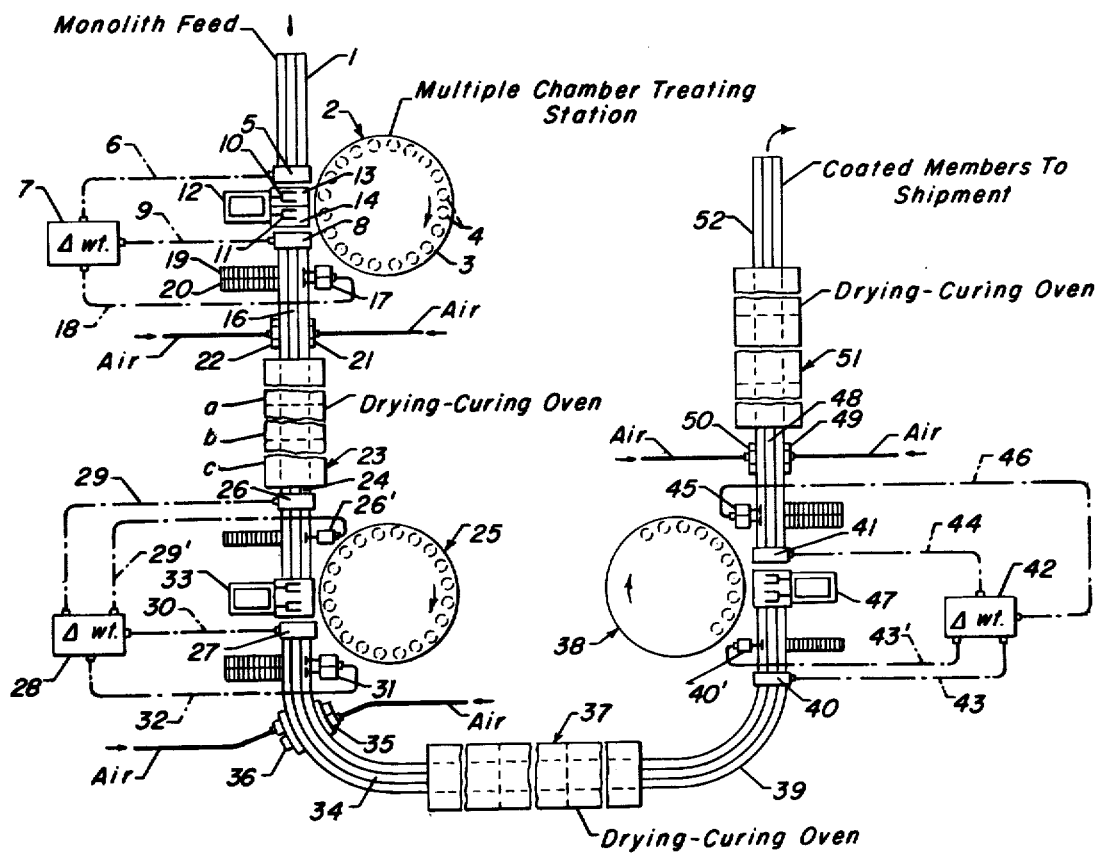

United States Patent [19]

Hoyer et al.

[11] 4,038,939
[45] Aug. 2, 1977

[54] CONTINUOUS SYSTEM FOR PROVIDING A CATALYTIC COATING ON SUPPORT MEMBERS

[75] Inventors: William A. Hoyer, Evanston; Lowell W. Johnson; Richard J. Schoenenberger, both of Kildeer, all of Ill.

[73] Assignee: Universal Oil Products Company, Des Plaines, Ill.

[21] Appl. No.: 641,117

[22] Filed: Dec. 15, 1975

Related U.S. Application Data

[62] Division of Ser. No. 516,519, Oct. 21, 1974, Pat. No. 3,948,213.

[51] Int. Cl.² .................... B05C 11/06; B05C 3/109
[52] U.S. Cl. ................................... 118/4; 118/9; 118/63; 118/66; 118/50; 118/500; 427/8; 427/348
[58] Field of Search .............. 118/4, 50, 50.1, 63, 118/500, 66, 9, 423, 429; 427/8, 294, 348; 252/466 PT

[56] References Cited

U.S. PATENT DOCUMENTS

| 2,135,127 | 11/1938 | Hoy et al. | 118/50 |
| 2,890,679 | 6/1959 | Poulson | 118/63 X |
| 3,205,086 | 9/1965 | Brick et al. | 118/73 X |
| 3,331,787 | 7/1967 | Keith et al. | 252/466 PT |
| 3,378,676 | 4/1968 | Clement | 118/8 |
| 3,494,324 | 2/1970 | Bauer et al. | 118/63 |
| 3,565,830 | 2/1971 | Keith et al. | 252/466 PT |
| 3,675,563 | 7/1972 | Metreaud | 118/319 |
| 3,695,219 | 10/1972 | Arian et al. | 118/63 |

Primary Examiner—Mervin Stein
Attorney, Agent, or Firm—James R. Hoatson, Jr.; Philip T. Liggett; William H. Page, II

[57] ABSTRACT

A processing system which can provide a continuous assembly-line procedure for placing a catalytic coating on ceramic honeycomb type members embodies the use of a plurality of pressure tight chambers such that each ceramic member can be vacuum treated and then rapidly coated, as well as pressure treated and air blown to effect rapid coating fluid removal and partial drying. After each coating operation, there is controlled drying and high temperature curing. Also, in a preferred controlled system, there is a weighing of each element before and after each coating step to determine an amount of coating retained for comparison with a predetermined standard.

7 Claims, 3 Drawing Figures

CONTINUOUS SYSTEM FOR PROVIDING A CATALYTIC COATING ON SUPPORT MEMBERS

This is a division of application Ser. No. 516,519, filed Oct. 21, 1974, now U.S. Pat. No. 3,948,213, issued Apr. 6, 1976.

The present invention relates to a processing system which can provide a rapid assembly-line procedure for effecting the catalytic coating of rigid ceramic, honeycomb type elements.

More particularly, the invention embodies the use of a plurality of pressure tight chambers with lift door or wall means on a moving table arrangement, conveyor means, automatic weighing means and drying and curing ovens, such that there can be both rapid and controlled coating operations.

The need to convert the noxious components in vehicular exhaust gases is now well known as a means for overcoming air pollution. Also, the present and proposed future requirement for having catalytic exhaust gas converters on motor vehicles are quite well known. The catalyst for the various forms of converters are, at this time, being manufactured and supplied in two general forms, namely: (1) as catalytically coated rigid skeletal monoliths, or honeycomb type of elements, where there are a multiplicity of longitudinal passageways in each unit in order to provide a large nominal surface area; and (2) as confined batches or beds of catalytically coated paticulates which, in turn, may be generally spherical or of small pellet form, with nominal diameters and lengths in the 1/16 to 5/16 inch range.

The spheres and pellets are of advantage as catalyst support material to the extent that they can be made from refractory inorganic oxides, typically of alumina, or of alumina with one or more other oxides as additives to help stabilize for strength, heat resistance, etc., such that they have surfaces with resulting high porosity and large resulting actual surface areas as compared to the more dense "ceramic" monoliths. On the other hand, pills and pellets are far more fragile than the rigid, monolithic type of honeycomb elements and are more easily broken when placed in service on an auto or truck. The small spheres or pellets are especially subject to exhaust gas pulsations from the engine operation such that a breakage rate can be quite high for loosely packed beds of these rather fragile members. The rigid monolithic, honeycomb structures are typically made from ceramics which comprise refractory crystalline materials such as sillimanite, magnesium silicates, zircon, petalite, spodumene, cordierite, aluminosilicates, mullite, or combinations thereof, etc. Such materials, which are of varying compositions of silica, magnesium and alumina, are considered to have surface porosity; however, as heretofore noted, their surfaces are not highly porous to the same extent as obtained with a lower bulk density alumina pill or extrudate and it is generally advisable to provide an alumina coating over the skeletal structure prior to effecting surface impregnation with the catalytically active component. These monolithic, substantially catalytically-inactive crystalline support members have been described in prior art patents, as for example in Keith et al. U.S. Pat. Nos. 3,331,787 and 3,565,830, such that it is not deemed necessary to describe them in detail herein.

Typically, the catalytic component will comprise a noble metal such as platinum or palladium, or a mixture thereof, for providing a highly active oxidation catalyst; however, other active metals may well be used to provide a particular type of catalytic coating. Actually, it is not intended to limit the present invention, which is being directed to coating apparatus and to coating systems, to any one specific type of catalyst coating or coatings, inasmuch as oxidation catalyst materials may comprise the metals of Groups I, V, VI and VIII of the Periodic Table, particularly copper, silver, vanadium, chromium, iron, cobalt, nickel, platinum and palladium, with a component being used singly or in combination with one or more active component.

Reducing coatings may comprise oxides of copper or of copper-iron, copper-nickel, etc., as well as platinum group metals.

While the use of catalyst coatings on particulates and on rigid skeletal elements, as well as various methods of applying coatings, have been known for some years, there is no present awareness of prior art systems and apparatus suitable for effecting a high volume production of catalytically coated elements suitable for use in automobile exhaust gas converters. For example, the aforementioned U.S. Patents set forth various methods for coating a refractory honeycomb type of member with alumina and an active catalytic coating. However, dipping and spraying operations are not nearly rapid enough to provide a good assembly-line production system which will permit, for example, the coating of an element with alumina or other refractory inorganic oxide and the catalytic impregnation of the oxide coated element in a time period of less than one and one-half minutes to two minutes. Also, it is not believed that there have been any continuous manufacturing systems embodying the use of a plurality of pressure tight treating chambers on moving table means and in combination with conveyor means, drying and curing oven means, etc., to effect the sequential treating of a multiplicity of support members all at the same time. Nor has there been any known prior art teaching with regard to using vacuum treating on a rigid skeletal member in order to more rapidly degassify or "out-gas" the substrate and provide an improved fast coating procedure.

It is thus a principle object of the present invention to provide a continuous assembly-line procedure for handling catalyst support members by embodying moving table means that can effect the sequential treatment of a multiplicity of members, mechanical member handling means and conveyor means to pass partially treated members from one stage to another, as well as through heating and curing ovens.

It is a further object of the present invention to provide a processing system which utilizes similar apparatus and similar coating procedures for effect the alumina coating on the support members and the impregnation of the active catalyst component onto the coated members, such that both procedures can be integrated into the same assembly line.

Another object of the present invention resides in obtaining the quality control of the coated elements by having automatic weighing means integrated into the system such that weighings before and after each coating procedure will provide differential weights to, in turn, provide a measure of the amount of coating being retained and means for comparison with a predetermined standard for obtaining a desired coating.

Still other objects and advantages will be set forth and made apparent in subsequent portions of this specification.

In broad aspect, the present invention provides a processing system which can provide for a continuous assembly-line procedure in effecting the placement of a catalytic coating on a ceramic honeycomb type member with longitudinal passageways therethrough, which comprises the steps of: (a) placing an uncoated member into a pressure tight, confined chamber and supporting it therein to preclude blockage of its longitudinal passageways; (b) evacuating said chamber to effect a vacuum in the pores of said ceramic member; (c) subsequently filling said chamber with a slurry of inorganic oxide coating material and passing the slurry through the passageways thereof to coat the surface and fill the pores of the member; (d) draining slurry from said confined chamber and then subsequently blowing pressurized air therethrough to remove excess slurry from said chamber and from the surfaces of the member; (e) effecting the removal of the thusly coated member from said chamber; (f) passing the resulting inorganic oxide coated member to a drying and heat treating zone to effect the high temperature curing thereof; (g) subsequently cooling the resulting oxide coated member and then again placing it in a pressure tight confined chamber, whereby said mebmer is subjected to the sequential steps of vacuum treating, coating and impregnating with a solution containing a catalytically active component and blowing with air to remove excess solution, all in a manner similar to steps (a) through (d); (h) effecting the removal of the resulting activated member; (i) passing the resulting impregnated member to a drying and curing zone to effect a high temperature curing thereof; and (j) subsequently withdrawing a finished catalytically coated member.

In a preferred system and method of operation, there will also be provision to weigh the support member both before and after each coating operation to provide a measure of the coating being placed on each element and for comparison with a predetermined standard. In other words, where there is an alumina coating being placed on the substrate, it is desirable to make sure there is uniformity in coating prior to sending the element on through a successive stage for a second alumina coating or for catalyst impregnation. Various means may be utilized for effecting the weighing operation, as for example, there is employed an automatic lifting and weighing means which will raise the element from a conveyor belt or from conveyor rollers for a short period of time in order to record a weight and then reset the element on the conveyor means. In combination with the weigher, there may be provided automatic element removal means, as for example a pusher type of apparatus which will be effective to push an overweight or underweight element from the conveyor belt as it passes the "pusher station". In one arrangement, suitable counting means will be provided to take note of an underweight or overweight element as recorded from a differential weight calculator means in turn connecting to the "before" and "after" weighing means such that the right element is being pushed from the assembly-line of elements on the conveyor means.

The calculations and recordings for differential weights obtained at each coating station are also of advantage in maintaining quality control on a particular coating material. For example, in connection with the alunina coating step, there is preferential absorption of water from the alumina slurry, along with the alumina deposition, such that the excess alumina slurry which is returned from a coating station to a blow-down tank or other slurry collecting chamber will be rich in alumina as compared to the desired feed slurry stream to be passed to the coating chamber. Where the differential weight is noted to be either greater or lesser than a desired predetermined standard, then the slurry supply tank can be modified to change alumina content from the make-up tank, or otherwise, so as to make the slurry supply have a proper ratio of alumina content to in turn provide the desired predetermined amount of alumina on a resulting coating.

In a similar manner, in connection with the catalytically active agent, there is the need to maintain a proper impregnating solution to result in a proper differential weight impregnation as determined by effecting weighings before and after each catalyst support impregnation. For example, in effecting the impregnation of an alumina coated rigid substrate with chloroplatinic acid, there will be a weighing of the substrate member prior to impregnation and following the impregnation. The differential weight calculated will, in turn, provide an indication as to whether or not there has been a proper predetermined quantity of the impregnating solution supplied to the member at the impregnation station. In the case of catalyst impregnation, the platinum component is preferentially absorbed by the substrate such that the excess impregnating solution returning by way of a blow-down tank back to the impregnating solution supply chamber will be deficient in platinum and the impregnating solution make-up to such chamber must be adjusted accordingly. While differential weight measurements will provide an indication of the suitablility of the content of the impregnating solution, there may also be other measurement means to insure quality control; for example, there may be a monitoring of the impregnating solution, or a monitoring of the resulting catalytic surface after the impregnation step on the substrate, by the use of X-ray florescence.

In the present improved assembly-line system, each coating or impregnation station will provide a plurality of pressure tight chambers each of which will have suitable door means or a lifting wall arrangement such that each support member may be inserted into the interior of a chamber to undergo the successive steps of vacuum treating, coating and air blowing. Thus, in a preferred arrangement, a plurality of pressure tight chambers will be provided on a turning table means, or other movable table means, such that there will be a plurality of support members undergoing coating treatments in a sequential operation all at the same time period. Suitable means is also provided in association with each multiple chamber moving table means such that there is provision for sequentially feeding an uncoated element into each of the chambers as well as means for removing a coated element from each chamber after the completion of the cycle of treatment within each chamber.

A preferred apparatus arrangement will also provide means for the placement of honeycomb types of members in a vertical positioning within each treating chamber such that there will be the free flow of vacuum and treating fluids through all of the passageways of an element. Also, there can be apparatus means for effecting the 90° turn for each support member after it is removed from a treating chamber for permitting further air blowing and drying of wet elements. Although there is provision for effecting high pressure air flow for a predetermined time period through each of the honeycomb elements in each treating chamber there is preferably additional air flow provided through honeycomb passageways after the removal of each element from a pressure tight chamber. Thus, by having apparatus to effect a 90° turn of an element whereby vertically oriented passageways will become horizontal on the conveyor belt leaving the coating station, there can be further air flow through the passageways and preclude slurry or impregnating solution droplets from blocking passageways. Various means may be provided for effecting further air flow through honeycomb type elements; however, in one desirable type of apparatus arrangement, there may be a series of air nozzles provided on each side of the member carrying coneyor means such that the air can flow through the passageways and effect further atmospheric drying and the desired blowing out of any undesirable droplets that may tend to form in the passageways. A preferred arrangement will also provide for the vertical and lateral staggering of the air nozzle means such that air flow will come from both sides of the conveyor means and be directed into both ends of substrate passageways at varying levels which will transverse the entire end surfaces.

The improved system of the present invention will also provide suitable drying and curing oven means following each coating station such that there is proper dyring and curing of each element prior to its moving to a next coating stage or prior to its being shipped as a finished product. Preferably, the ovens will operate in a manner to effect a timed drying stage of the order of 300° to 450° F. and then subsequently entering a higher temperature curing zone maintaining temperatures in the range of 850° to 1000° F. with the latter stage being then followed by a controlled cooling zone where each of the elements will be cooled down to approximately atmospheric temperature. Also in a preferred apparatus arrangement and following a preferred drying procedure, the elements will be oriented such that heated air flow can pass through the multiplicity of passageways of each honeycomb type element in order to obtain the most rapid and uniform type of heating for each individual element. Various oven designs and arrangements may, of course, be provided within the scope of the present invention and it is not intended to limit the improved system to any one type of oven or to any one type of conveyor means for carrying the multiplicity of elements through the oven zones at any one time. For example, there may be provision to transfer a single line of spaced apart elements being carried on a narrow conveyor means from a coating zone to a wider type of heat resistant conveyor screen which will carry more closely spaced elements through the oven sections, with suitable stop means, counting means, and pusher means being employed to effect a closer spacing of members for passage through the oven zones. In other words, there may be a more compact arrangement of elements for passage through the oven zones as long as there is provision for suitable hot air passage between elements in any one row and between successive rows thereof.

In an assembly-line system which is provided to accommodate substrate materials which have high porosity and are suitable for catalytic agent impregnation without the need of a refractory inorganic oxide coating, there may be utilized a single coating station in turn providing for a plurality of opening and closing pressure tight treating chambers such that there may be the assembly-line successive feeding of catalyst support members into each of the chambers and automatic removal of resulting impregnated elements from each of the chambers, together with associated apparatus which will effect weighings before and after a coating, means for the computation of a differential weight resulting from each coating operation, means for eliminating non-standard elements, and means for effecting drying and curing of the treated member. On the other hand, where a crystalline, ceramic type, honeycomb element is being utilized as a catalyst support member and there is the need to have a more porous surface prior to catalytic impregnation such that there will be a coating of alumina, or other refractory inorganic oxide coating material, then the assembly-line system will provide at least two coating stations in order that there may be the placement of the alumina coating prior to effecting the placement of the catalyst agent. It is also within the scope of the present invention to provide an apparatus system for automatically handling catalyst support elements so as to provide for two or more separate coating stations ahead of a single catalyst impregnation station. In such an arrangement, each of the multiple chamber moving table coating stations can be similar and all of the associated weighing means or other quality control means associated therewith can be similar. There will, of course, be variations in slurry supplying chambers, make-up tanks, etc., with respect to a station supplying an inorganic oxide coating and in connection with a station supplying a catalyst agent in an impregnating solution.

Reference to the accompanying drawings and the following descriptions thereof will assist in describing the present improved assembly-line system and the methods for effecting continuous coatings and catalyst impregnations on monolith type of support members.

FIG. 1 of the drawing is a diagrammatic plan view arrangement indicating a plurality of multiple chamber coating stations, weighing means, air drying means, oven means and suitable conveyor means for effecting the continuous assembly-line movement of catalyst support members through the entire system.

Figure 2:
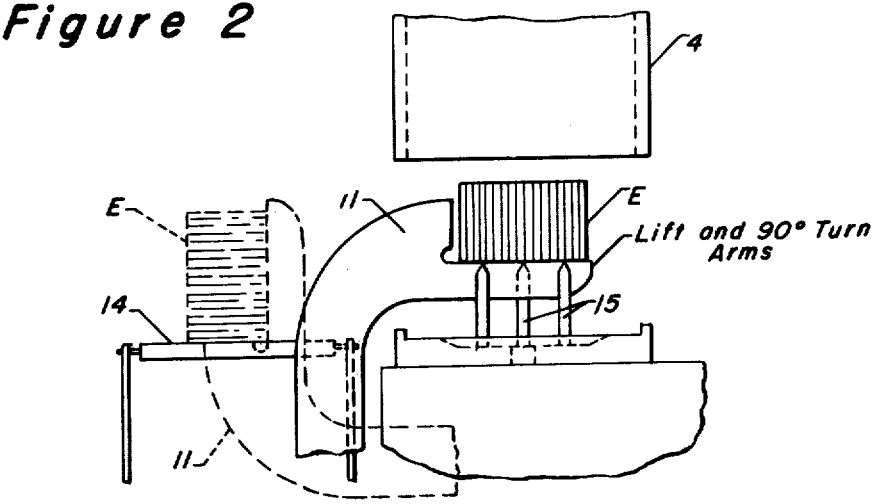

FIG. 2 of the drawing is a diagrammatic partial sectional elevational view indicating a support member removal means for use in taking members from each lifting wall treating chamber, and also effective to cause a 90° turn of each support member in order to provide that the honeycomb passageways will be in a generally horizontal position on the conveyor means leaving the treating chambers.

Figure 3:
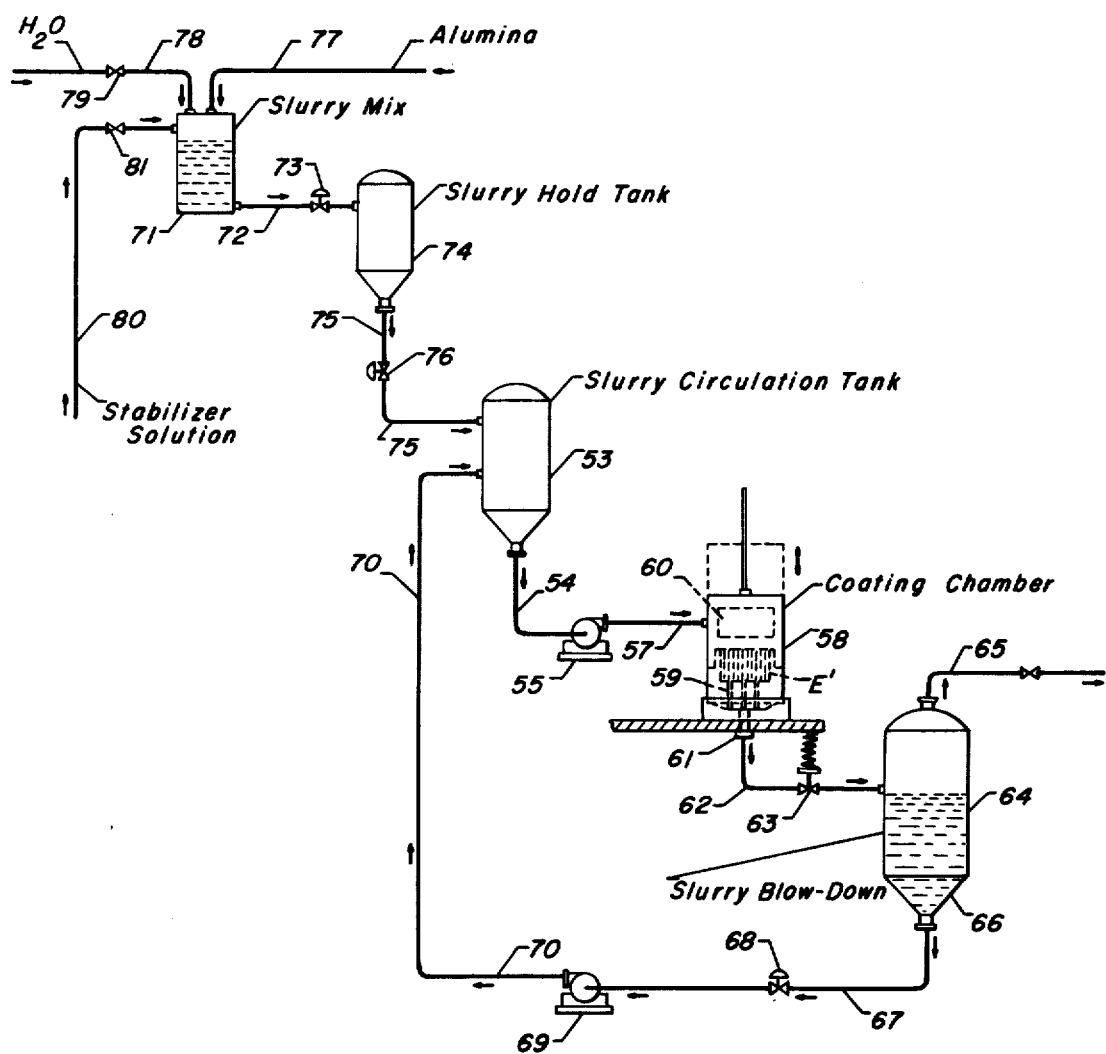

FIG. 3 of the drawing is a diagrammatic elevational view indicating the handling of a coating fluid in association with a multiple chamber coating station, including the recycle of blow-down fluid back to a supply tank for reuse in the system.

Referring now particularly to FIG. 1 of the drawing, there is indicated an initial conveyor means 1 suitable to carry a line of spaced monlithic elements to a first multiple chamber treating station at 2. Each station will have a moving table arrangement, such as the rotating table means 3 with a plurality of pressure tight chambers, such as indicated at 4 which can handle a multiplicity of support members in sequential stages of treatment. In other words, in such a rotating table arrangement, there will be the successive feeding of a monolith (one to a chamber) into each of the pressure tight chambers spaced on the rotating table as the latter incrementally rotates, while at the same time there will be the removal of a treated element from each chamber as it completes the rotating cycle, and after each element has undergone the successive treatments of vacuum treating, slurry or liquid treating and air blowing.

In connection with FIG. 1, which illustrates three multiple chamber treating stations, there are available two treating stations to effect the coating of a refractory inorganic oxide coating, such as alumina, in order to have a highly porous surface available on each substrate for the third stage catalyst impregnation step. Thus, for descriptive purposes, treating station 2 will be set forth as providing an inorganic oxide slurry coating to each of the monolith substrates being brought to the plurality of chambers 4 on turn table means 3.

Each substrate will normally have had a preliminary check as to weight, size and freedom from flow, etc.; however, in association with the treating station 2, there is indicated a first weighing station 5 connective through line 6 to a weight recording-calculator means 7 and a second weighing station 8 which also connects, through line means 9, with the weight recording-calculator means 7 in order that the latter may, in turn, compute a differential weight, or weight gain, for an element after being coated. Equipment for automatically and rapidly weighing items that are being carried on a conveyor system and additional apparatus for recording a weight, or a signal indicative of a weight, such that a differential weight for an item undergoing a processing operation may be obtained, is generally conventional and now commercially available. For example, weighing apparatus and recorder means adapted for use with conveyor belts and roller systems are manufactured and supplied by Hi-Speed Checkweigher Co., Ithaca, N.Y. and the Toledo Scale Corporation, Toledo, Ohio. It is understood that automatic weighing means in association with conveyor means have been used in canning and bottling operations as well as for many types of manufacturing operations, where there is the recording of an initial weight of an element or item as well as the recording of a weight after a particular manufacturing procedure in order to permit an automatic differential weight calculation.

There is also indicated in association with treating station 2 the use of mechanical arm means at 10 and 11 from motor or power supply means 12. The movable arm means 10 will be of a type suitable to lift a catalyst support element from conveyor roller means at 13, following the weighing means 5, and then carry the element laterally to the interior of a pressure tight chamber 4 mounted on turn table means 3. Lift blades or arms which can be raised between spaced roller means for the movement of items to be processed are also conventional types of apparatus and need not be described in detail herein. However, as heretofore noted, it is preferable that each of the chambers 4 will have suitable catalyst support means, such as small spaced pin means, which will permit the placement of the honeycomb-type element in the interior of the chamber by the lift arm means 10 and permit free flow of treating fluid and pressurized air through all of the channels of the element without causing flow blockage. Thus, the lifting means 10 will be designed and adapted to operate in conjunction with spaced support means within the lower portion of each pressure tight treating chamber 4 whereby each element will be properly centrally positioned in a chamber. In a similar aspect, lifting arm or lifting blade means 11 will be designed and adapted to effect the lifting of a treated member out from the interior of a treating chamber 4 and then move it laterally back to the roller conveyor means at 14 (below blade means 11) such that each element may then be moved to weighing device 8 to record its weight gain after being through the coating operation.

The removal arm means 11 may be substantially similar to the element placement arm means 10, or preferably for honeycomb members, will be modified in its operation to effect a 90° turn of each element as it is removed from a treating chamber such that honeycomb passageways will be oriented in a generally horizontal manner, rather than in the vertical manner provided within each treating chamber. Reference to FIG. 2 of the drawing shows diagrammatically how lifting arm means 11 can serve to lift a substrate element E from pin means 15 then move laterally back over conveyor rollers at 14 while at the same time effecting a 90° rotation such that element E can rest on roller means 14 with passageways in a generally horizontal position. Motive power means and pivot means associated with arm means 11 and power supply means 12 are not indicated in FIG. 2 of the drawing but may comprise conventional mechanisms or linkages which will effect the desired combined lateral and 90° turn motions for the arm means 11.

After each element has been through weight measuring means 8 it will move onto additional conveyor means at 16 to pass by an element removal means at 17. The latter is connective with the weight recorder-computer device 7 through means 18 such that there can be removal of elements which may be underweight or overweight following the initial coating operation. The element removal station 17 is preferably provided with "two pusher means" whereby elements that are underweight will be pushed from the conveyor means 16 onto a set of roller means 19 or, alternatively, pushed onto a separate line of roller means 20 in the event the element is overweight as determined standard for a differential weight gain.

For all elements having a suitable weight gain and passing the pusher station 17 on conveyor means 16, there is, in a preferred arrangement, further air drying from nozzle means at 21 and 22 so as to preclude any fluid droplets effecting a blockage of honeycomb passageways in the elements prior to their entering the drying and curing ovens. The air nozzles at 21 and 22 will, as hereinbefore noted, be preferably placed in staggered arrangements such that the streams of air from the respective nozzles will generally traverse all of the area of each end portion of each monolithic element as it passes the blowing station.

Following the first multiple chamber treating station 2, there is provided a first drying oven 23 which, in turn, will have at least three treating zones, namely: (a) an initial drying zone operating at moderate temperatures in the range of from 300° to 450° F.; (b) a high temperature curing zone with a range of from 850° to 1000° F. and (c) a cool down zone permitting the element to drop in temperature down to the order of 100° F. Drying and curing time periods may vary in accordance with varying types of slurry coatings or catlyst impregnation coatings; however, generally each stage of the oven may encompass a time period of from ½ hour to 2 hours such that a properly cured element will be ready for the next coating stage.

Following oven means 23, a conveyor means 24 will continuously carry a line of elements to a second treating station 25 where again each element will be introduced into a treating chamber for the successive stages of vacuum treating, fluid treating, and air blowing, with the latter comprising heated air blower means to effect the removal of excess fluid and a partial drying. Again, there will be associated with the treating station 25 suitable weighing means at 26 and 27 to be connective with weight gain measuring means 28 through line means 29 and 30 as well as element rejection means at 26' and 31 which can receive suitable discard signal from the weighing-computer means 28 by way of lines 29' and 32. The rejection means at 26' permits the removal of a coated and dried element prior to undergoing a second stage of treatment in the event the first coating treatment results in an improper weight gain not within a predetermined range for a dried member. The rejection means at 31, like that at 17, acts according to a differential weight gain of a still wet element. Also, there will be suitable loading and unloading arm means at 33 to effect the necessary loading and unloading of elements from the individual pressure tight chambers being carried on moving table means at station 25.

In a similar manner to the operation following the initial coating station, there is a conveyor means 34 to carry elements after a second stage coating through air blower means on each side of the conveyor, at 35 and 36, with spaced nozzles to suitable traverse the end surfaces of each element as they pass thereby and thus preclude formation of droplet blockages in honeycomb passageways. The conveyor means 34 further carries the elements from the second stage coating into a drying oven means 37 which, like drying oven 23, will comprise three temperature stages to in turn provide for initial drying, high temperature curing and cool down.

In accordance with FIG. 1, the elements leaving drying oven 37 are passed to a third treating station at 38, where each coated member will be subjected to the catalytic impregnation of its coated surface in individual chambers. Again, a plurality of pressure tight chambers with opening walls or door means are carried on a rotating table means in a manner similar to the arrangement at treating station 2. The impregnation operation can also be similar to the refractory inorganic oxide coating operation to the extent that each element will be retained in a pressure tight chamber while undergoing vacuum, fluid impregnation, and air blowing to effect the removal of excess fluid and provide initial drying.

As with the prior treating station, a conveyor means 39 will carry elements to the equipment associated with treating station 38, including weighing devices at 40 and 41 which are connective with weight recording-computer means 42 through lines 43 and 44. There is also indicated a member rejection means at 40' and 45 connective with the computer means 42 through the respective lines 43' and 46, while element loading and unloading means at 47 will have movable arm or blade means which will effect the desired loading and unloading of elements with respect to the interior portions of the pressure tight chambers retained on the moving table at treating station 38. The chambers for this station will have their interiors of a resistant metal, such as of tantalum, or plastic to withstand the acidic impregnating solution to be introduced into each chamber. Preferably, the unloading arm means will be of the type described in connection with treating stations 2 and 25, as well as described in connection with FIG. 2 of the drawing, where there will be a 90° tipping of each element as it is unloaded from a pressure tight chamber in order to have its passageways in a horizontal position to, in turn, pass on conveyor means 48 between air nozzle at 49 and 50. Again, air will be supplied through the latter from valve controlled supply lines such that there is high pressure air discharge from a plurality of spaced nozzles which will traverse the exposed end portins of each honeycomb as it is carried on the conveyor means through the air nozzle zone.

The conveyor means 48 is indicated as suitable for carrying a continuous line of elements to drying and curing oven means at 51 such that there will be suitable drying and curing of each catalytically coated element. Typically the oven 51 will be divided into three different temperature zones in a similar manner to the ovens 23 and 37 where there is an intermediate temperature preliminary drying, a subsequent high temperature curing and a cool down prior to the discharge of the coated element. Depending upon the type of catalyst being manufactured, there may be somewhat different temperature curing conditions following this catalyst impregnation step in oven 51 as compared to curing the refractory inorganic oxide coatings being effected at treating stations 2 and 25 and being dried and cured in their respective ovens 23 and 37.

Additional impregnation stations could be provided in connection with the application of certain catalytic coatings; however, typically a single catalyst impregnation stage will suffice to effect the adequate coating or impregnation of an inorganic oxide coated substrate such that fully treated and cured elements may be discharged by way of conveyor means 52 for packing and shipment. Also in connection with the preparation of certain catalysts, it may be desirable to effect a reduction step in lieu of, or in addition to, high temperature curing in the presence of air, such that a modified type of oven could be used or an additional zone may be provided in connection with oven 51 to introduce a high temperature reducing stream for contact with the surface of the impregnated element. Alternatively, an entirely separate reducing oven may be provided down stage of the catalyst impregnation station.

With particular reference to FIG. 3 of the drawing, which shows diagrammatically a slurry handling system for use in combination with a treating station, there is indicated one embodiment of a multiple chamber arrangement for handling a refractory inorganic oxide coating material, such as alumina. Specifically, there is indicated a slurry circulation tank 53 connecting through line 54, pump means 55, and line means 57 to a pressure tight coating chamber 58. The latter is indicated diagrammatically as having a lifting wall adapted to hold a monolith E' on support pin means 59 such that fluid introduced into the upper chamber portion 60 flows down through the honeycomb passageways of the element to outlet means 61 and be transferred by way of line 62 and valve means 63 into a slurry blowdown tank 64. The latter is provided with a valved vent line 65 and a lower outlet 66 connecting with conduit 67, having control valve means 68, in turn connecting with pump means 69 and recycle conduit means 70 so as to return excess slurry back into the slurry circulation tank 53.

There is also indicated the provision for an alumina slurry mixing chamber at 71 connective through line 72 and valve 73 to a hold tank 74. The latter in turn connects through line 75, having valve 76, to the slurry circulation tank 53. In view of the fact that during the coating operation there is a selective absorption of water from the slurry stream, there is a resulting alumina-rich stream returning by way of line 70 into tank 53 and it is thus desirable to provide an alumina lean mixture within the slurry hold tank 74 to effect a resulting desired alumina solids content in the circulation tank 53. For example, where it is desired to have an approximate 25% by weight alumina solids within the slurry circulation tank 53 for contact with the honeycomb element, then the mixture in slurry hold tank 74 will have less than 25% alumina solids to compensate for the rich alumina stream returning by way of line 70 from the blow-down tank 64. Where alumina is being used as a preferred coating material for the catalyst substrates, typically mono-alumina hydrate will be supplied in dried-powder form by way of inlet means 77 to mix tank 71 and water introduced into the same mix tank by way of line 78 with valve means 79.

There is also an indication in FIG. 3 that a stabilizer solution (as for example a barium salt solution) is introduced into the same mix tank 71 by way of line 80 and valve control valve means 81. For purposes of simplifying the drawing, there is no indication of mechanical mixing means in any of the slurry handling tanks; however, the tanks or chambers handling the slurry of alumina and water, or other refractory inorganic oxide material in water, will typically have rotating mixing blades, or other powered mixer means, within the interior of each slurry holding tank in order to prevent the settling of alumina and the blockage of tanks and lines in the system.

In connection with the chambers and conduits accommodating the catalytically active impregnating solution there will be an arrangement quite similar to that used in handling alumina or other inorganic oxide slurry, and as shown in FIG. 3. In other words, there will be a suitable tank providing direct flow to each pressure tight treating chamber, a blow-down tank to receive excess treating fluid, means to recirculate the fluid back to the liquid supplying tank and suitable mixing and/or holding tank means to accommodate the preparation of the catalyst agent into a suitable catalytic treating solution whereby it may be passed into the impregnating solution supply tank for admixture with the recirculated treating fluid from the blow-down tank. As hereinbefore pointed out, when using an impregnating solution, such as chloroplatinic acid, for providing catalyst elements with a resulting platinum-alumina complex as the active ingredient, there will be the selective withdrawal of the platinum component from the solution and a platinum lean stream returned to the supply tank from the blow-down tank. As a result, the make-up tank feeding into the principle catalyst solution supply tank will be a platinum-rich mixture to compensate for the platinum-lean mixture being admixed therewith. It is to be further pointed out that the make-up of the impregnating solution may be modified periodically in accordance with predetermined standards and responsive to weight gains being indicated by the differential weight measuring apparatus associated with the impregnation station of the system, such as at station 38 of FIG. 1 of the drawing, and the differential weight computing means at 42. Still other quality control procedures may be incorporated in combination with the present assembly-line treating procedure and it is not intended to limit this invention to any one type of analytical procedure or adjustment procedure resulting from a determination of the amount of catalyst deposition taking place in connection with the catalyst impregnation station.

It is to be understood that many types of modifications may be made with respect to the number of treating stations utilized, the physical locations of stations with respect to each other or with respect to drying ovens, or the like, and that many types of individual designs and arrangements may be made with respect to each individual apparatus portion of the system. Treating conditions and treating materials may, of course, also vary with respect to various types of substrates and with respect to various sizes of substrates. It is also within the scope of the present invention to carry out the catalyst impregnation of porous substrates which are of a form other than of the honeycomb type, as for example, spherical pills or pellets, cylindrical pieces, etc., of a refractory inorganic oxide material having a high surface area and suitable for impregnation with a catalyst agent. In a specific aspect, small subdivided alumina pills, made by an oil-drop method, or otherwise, are retained in suitable screen-mesh containers, or other perforate wall means, and each container readily accommodated within a pressure tight chamber on the moving table treating station means to result in an assembly-line operational system in the same manner as the handling of the honeycomb monoliths.

In order to further illustrate the operation of the present assembly-line system in effecting the coating and impregnation of generally catalytically inert ceramic type substrates, the following example is set forth in an illustrative operation, where there will be at least one precoat stage to effect the placing of a more porous surface refractory oxide coating material onto the substrate prior to effecting the impregnation of the solution containing a catalyst agent.

EXAMPLE

In an overall operation following the schematic procedure of FIG. 1, there is set forth the two-stage refractory oxide coating and the single stage catalytic impregnation of a rigid monolithic ceramic type element. The latter being of a substantially catalytically inert silica-magnesia-alumina crystalline material such as of the aforementioned cordierite, mullite, spodumene, etc. type of material or a mixture thereof. At station 2, each element is weighed introduced into a pressure tight chamber in a sequential manner and each subjected to 20-25 inches of mercury of vacuum for a few seconds. The vacuum treating is followed by a moving slurry flow for a few seconds, with the alumina slurry comprising approximately 25% monoalumina hydrate, by weight, and a pH of from 3.8 to 4.2 The alumina slurry solution may also include a stabilizing material such as barium nitrate solution and a minor amount of nitric acid, with the barium nitrate comprising of the order of 15 to 20% by weight of the slurry and the nitric acid 1 to 2% by weight. After the vacuum treating and the alumina slury treatment, there will be a high pressure air flow to effect the removal of excess slurry from the surface of the honeycomb passageways and to provide a preliminary "skin" drying of the monolith. Typically the air pressure is of the order of 25-30 psi in order to provide a high velocity air stream for removing excess fluid, as well as for providing a superatmospheric pressure that is applied to the slurry solution itself prior to opening a blow-down valve from the outlet of the pressure tight chamber. Each air blown and treated element is removed from the treating station, followed by a weighing of the wet element to compare with a recorded weight obtained from a preliminary weighing of each element prior to insertion in a treating chamber. The weight gain, in turn, is compared to a standard weight gain range such that in the event that the resulting weight for any one of the elements is above or below the predetermined range there is a rejection of that particular element from the assembly-line. Such rejection may be accomplished through the use of a rejection means such as at 17 indicated diagrammatically in association with the treating station 2.

In order to maintain open passageways for all of the treated wet honeycomb elements, they are further subjected to blowing from pressurized air as they travel on the conveyor means 16 to oven means 23, with such air blowing being accomplished from the air supply nozzle means at 21 and 22.

As heretofore noted, a preferred operation utilizes oven means which will, in turn, provide for preliminary drying, high temperature curing and cool down. In one specific embodiment, the initial drying section of the oven provides for high temperature air-flue gas drying with a temperature range of from about 300° to 450° F. for an approximate 1 hour period. This initial stage is followed by a high temperature curing operation where there is an air-flue gas temperature of the order of 850° to 1000° F. carried out for an approximate 1 hour period. The third zone provides for a gradual cooling down of the elements such that the air streams are supplied to effect te cool down from the high temperature curing zone to approximately 100° F., or to ambient temperature.

In accordance with the provisions for the system of FIG. 1 of the drawing, there is a second alumina coating treating station at 25 where each preliminary coated element will receive a second alumina coating at conditions maintained generally in accordance with those previously outlined for the initial state coating. For example, approximately 6% alumina, by weight of the substrate, will be coated at each treating stage and a resulting substrate with approximately 12% alumina, by weight, will be passed to the third treating station at 38 where it will be subjected to impregnation with a catalyst agent.

Although various oxidizing catalyst agents may be used for auto exhaust gas purification purposes, the present illustrative embodiment utilizes platinum, palladium, or a mixture thereof to result in a noble metal platinum-palladium complex on the finished substrate. As with the other treating stations, each alumina coated element will have before and after weighings in order to provide a weight gain for comparison with a predetermined range of weight gains permissible to determine whether or not a particular element is to be rejected from the system. Each element will again be individually inserted into a separate pressure tight chamber at the impregnation station such that each element may in turn undergo vacuum treating in the 20–25 inches of mercury vacuum range, be subjected to impregnation solution flow, as well as have pressurized impregnation for a few seconds, and then be subjected to pressurized air blowing to effect removal of excess solution. Treated elements are then passed by way of conveyor means 48 through an additional air blowing zone such that all passageways are kept free of droplets which could cause blockage. The wet elements are then continuously passed through the drying and curing oven at 51 where again there will be a high temperature drying of the order of 350° to 450° F. for an approximate 1 hour period; a high temperature curing in the 850° to 1000° F. range for an approximate 1 hour period; and an approximate 1 hour cool down treatment to effect the discharge of fully coated and treated element at approximately atmospheric temperature.

As heretofore noted, varying types of catalyst agents and catalyst solutions may well be utilized to effect the impregnation of the alumina coated substrate and it is not intended to limit the present assembly-line system for the method of handling substrates in a rapid continuous manner to any type of catalyst impregnation. However, by way of example, the platinum or platinum-palladium solution which appear to provide the preferred catalyst agents for auto exhaust gas conversion will be provided in suitable strengths to provide of the order of 0.01 to 1.0% noble metal by weight of the element.

Also, as heretofore noted, various quality control procedures may be used in conjunction with the present system and it is not intended to limit the present invention to any one type of weighing means, analysis means, or the like. Actually, an element may be selected at random, or at a predetermined count, for laboratory analysis where there can be testing with respect to the amounts of alumina deposition, amount of noble metal deposition, conversion activity, etc. In another aspect, there may be varying X-ray florescence types of testings to measure resulting coatings or to provide continuous fluid analysis. The quality contol analyses results can then be utilized to manually adjust slurry or solution contents in the make-up of the particular mixes or, alternatively, through automatic adjustment of flow control means to make-up tanks there can also be automatic desired adjustments to the contents of the treating fluids such that there will be the proper weight gain, or analysis, of the resulting coated elements to meet predetermined standards.

We claim as our invention:

1. A processing apparatus system for providing a continuous, assembly-line, placement of catalytic coatings on refractory support members, which comprises in combination:
   a. a plurality of pressure tight chambers spaced apart on a moving table means, with each chamber having a movable wall portion to permit the insertion and withdrawal of a support member;
   b. conduit and valving means connective to said chamber to admit timed flow streams to the interior thereof;
   c. valved outlet means from the base portion of each chamber;
   d. member handling means adjacent said moving table means to provide for the insertion of a support member into said chamber and the removal of a treated member therefrom.
   e. conveyor means to bring members to the table and chamber and to carry members therefrom;
   f. additional conveyor means further providing movement of support members through a high temperature drying a curing heater means, with
   g. said heater means in turn having heated air blower means to effect hot air flow over and through said support members; and
   h. means for discharging a fully coated and heat cured member.

2. The processing apparatus system of claim 1 further characterized in that weighing means is provided in combination with said member handling means to provide for the weighing of each member prior to its insertion into a pressure tight chamber, additional weighing means is provided in combination with said member handling means to effect the weighing of each member following its removal from a pressure tight chamber, and said weighing means are connective with weight recorder-computer means to determine a weight gain for each individual member following contact with a coating material in such chamber.

3. The processing apparatus system of claim 2 further characterized in that a member eliminator means is provided in combination with said member handling means and following said treated member weighing means, with the eliminator means being connective with the weight recorder-computer means to receive signals therefrom and to effect a rejection of a member from the handling means responsive to a weight gain which is outside of a predetemined range of permissible weight gains for a member.

4. The processing apparatus system of claim 1 further characterized in that air streams from spaced nozzle means are positioned in close proximity to the conveyor means leaving the pressure tight chambers on the moving table means, with said nozzles being directed to flow air through the honeycomb passageways of each support member as it passes on the conveyor means and preclude droplet formations which could block passageways of the member.

5. The processing apparatus system of claim 1 further characterized in that a plurality of pressure tight chambers are provided on each of at least two moving table means to provide at least two stations for coatings, the first plurality of pressure tight chambers on a first moving table means providing for the introduction of a refractory inorganic oxide slurry to effect an oxide coating on each member passing through a first stage operation and a solution with a catalytic agent provided to the plurality of pressure tight chambers on a final moving table means of the system, whereby there will be the impregnation of a catalytic agent onto the previously coated and dried members.

6. The processing apparatus system of claim 1 further characterized in that the conduit and valving connective to each chamber on a moving table means is connective to a vacuum producing means, whereby each support member can be subjected to an out-gassing operation while within a pressure tight chamber.

7. The processing apparatus system of claim 1 further characterized in that said valved outlet means from each chamber is connective with a blow-down tank to collect excess coating fluid and such tank is connective with a coating fluid supply tank whereby the blow-down fluid material may be recycled to a supply source for reuse in the system, and said supply tank is in turn connective with said conduit and valving means which is connective to said pressure tight chambers for the admission of timed fluid streams to the interior thereof.

* * * * *